(12) United States Patent
Keller

(10) Patent No.: US 8,857,554 B1
(45) Date of Patent: Oct. 14, 2014

(54) STEERABLE AXLES TRANSAXLE ASSEMBLY

(75) Inventor: Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 420 days.

(21) Appl. No.: 13/399,428

(22) Filed: Feb. 17, 2012

Related U.S. Application Data

(60) Provisional application No. 61/446,095, filed on Feb. 24, 2011.

(51) Int. Cl.
*B60K 17/30* (2006.01)

(52) U.S. Cl.
USPC ........... 180/253; 180/254; 180/255; 180/256; 180/257; 180/258; 180/259; 180/260; 180/261; 180/262; 180/263

(58) Field of Classification Search
CPC .. B60K 17/303; B60K 17/306; B60K 17/358; B60K 17/30
USPC ................................. 180/253–263
See application file for complete search history.

(56) References Cited

U.S. PATENT DOCUMENTS

| | | | |
|---|---|---|---|
| 1,116,102 A | 11/1914 | Newsmith | |
| 1,296,216 A | 3/1919 | Reif | |
| 1,332,579 A | 3/1920 | Stewart | |
| 1,364,398 A | 1/1921 | Martin et al. | |
| 1,402,580 A | 1/1922 | Ditmars | |
| 1,506,653 A | 8/1924 | Meilike | |
| 1,852,226 A | 5/1931 | Asam | |
| 1,840,407 A | 1/1932 | Norman | |
| 2,306,958 A | 12/1942 | Kurti | |
| 2,346,143 A | 4/1944 | Asam | |
| 2,376,419 A | 5/1945 | Cole | |
| 2,456,865 A | 12/1948 | Cottingham | |
| 2,603,302 A | 7/1952 | Anderson | |
| 3,469,646 A | 9/1969 | O'Connor | |
| 3,980,151 A | 9/1976 | Murayama et al. | |
| 4,301,886 A | 11/1981 | Kinoshita et al. | |
| 4,418,783 A | 12/1983 | Teraoka et al. | |
| 4,442,914 A | 4/1984 | Nishihara | |
| 4,516,654 A | 5/1985 | Nishihara | |
| 4,553,624 A | 11/1985 | Yoshii | |
| 4,609,065 A | 9/1986 | Shikiya et al. | |
| 4,714,130 A | 12/1987 | Ujita et al. | |
| 4,723,623 A | 2/1988 | Teraoka et al. | |
| 4,798,260 A | 1/1989 | Nakata et al. | |
| 5,765,659 A | 6/1998 | Aoyama et al. | |
| 6,237,708 B1 | 5/2001 | Kawada | |
| 6,675,925 B2 | 1/2004 | Takahashi et al. | |
| 6,926,111 B1 * | 8/2005 | Irikura | 180/234 |
| 7,204,779 B2 | 4/2007 | Irikura et al. | |
| 7,240,759 B2 | 7/2007 | Uemura et al. | |
| 7,347,434 B2 | 3/2008 | Lewis et al. | |
| 7,588,103 B2 | 9/2009 | Iwaki et al. | |
| 7,849,689 B2 * | 12/2010 | Sakakura et al. | 60/488 |

* cited by examiner

*Primary Examiner* — Joseph M Rocca
*Assistant Examiner* — Marlon Arce
(74) *Attorney, Agent, or Firm* — Neal, Gerber & Eisenberg LLP

(57) ABSTRACT

A transaxle assembly is provided which is configured to be mounted to a frame of a vehicle. The transaxle assembly includes a transmission that has two separately attached pivotable knuckle assemblies. Each pivotable knuckle assembly can be independently steered and includes an axle driven by the transmission. Each axle drives a wheel of the vehicle. In another configuration, the two pivotable knuckle assemblies are joined by an integrally formed crossmember.

14 Claims, 8 Drawing Sheets

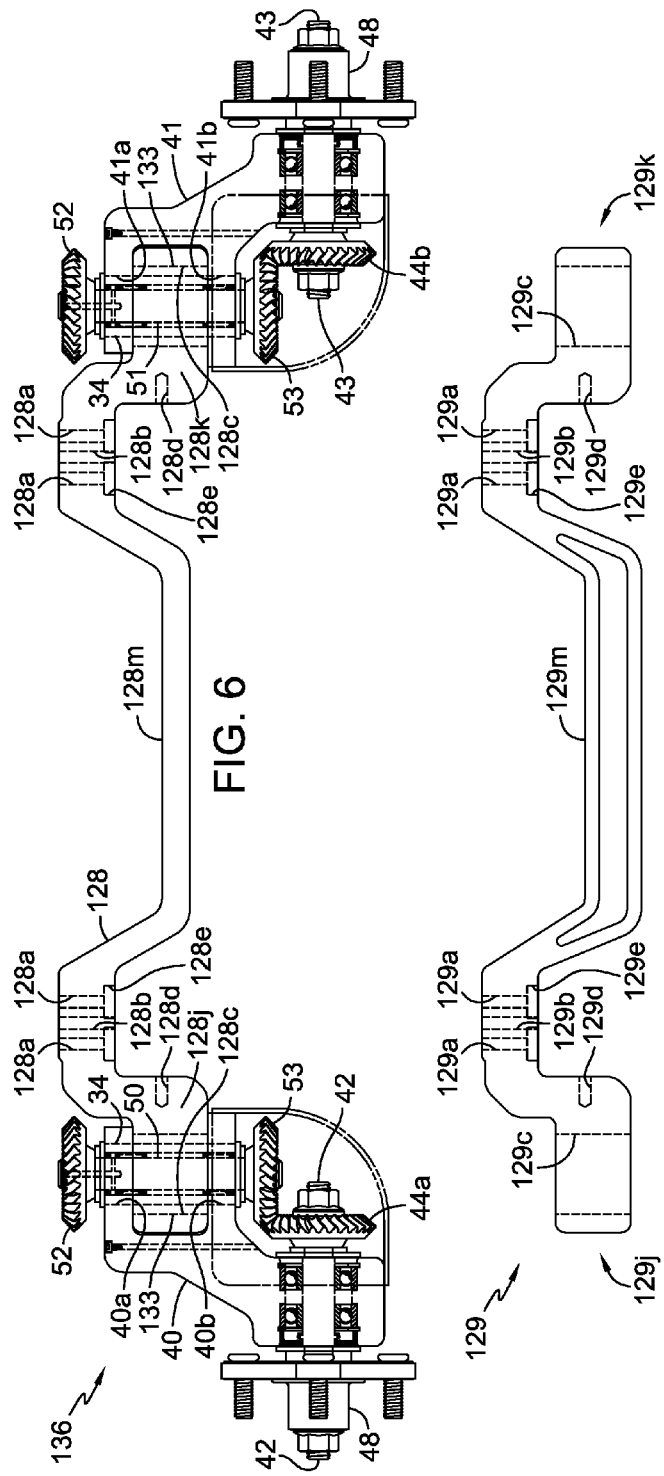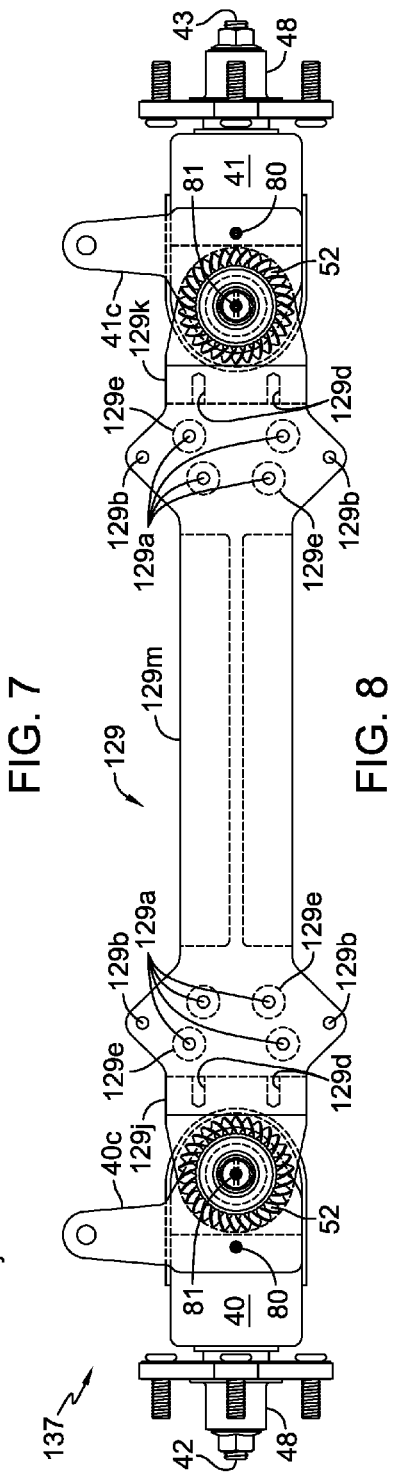

STEERABLE AXLES TRANSAXLE ASSEMBLY

RELATED APPLICATIONS

This application is a non-provisional of U.S. Patent Application No. 61/446,095, filed on Feb. 24, 2011. The contents of this application are incorporated by reference herein in its entirety.

BACKGROUND OF THE INVENTION

This application relates to transaxles generally and, in particular, to transaxles having steerable axles.

SUMMARY OF THE INVENTION

An improved steerable axles transaxle assembly is disclosed herein, as described in more detail below. One or more of the disclosed transaxle assemblies can be mounted to the frame of a vehicle, such as a lawn mower or utility vehicle, for example, to enable two-steered-wheel-drive, four-steered-wheel-drive, etc.

Unique pivotable knuckle assemblies, each including a pivot bearing support that is integrally formed with a specialized mounting flange, are pre-assembled and then attached to a transmission via the specialized mounting flange using a first set of fasteners. The resultant steerable axles transaxle assembly can then be attached directly to the vehicle frame via the specialized mounting flange using a second set of fasteners.

The pivot bearing supports of two pivotable knuckle assemblies can be joined together by an integral structural crossmember to form a dual pivotable knuckles assembly that can be attached to a transmission to reinforce the vehicle frame and protect the transmission from flexural and/or impact damage. Certain configurations of the pivot bearing supports described herein are designed to facilitate easy removal of the transmission from a vehicle for servicing, without removing the pivotable knuckle assemblies (or dual pivotable knuckles assembly) from the vehicle frame.

The pivotable knuckle(s) assemblies disclosed herein are suitable for conversion of a variety of transmission types, such as mechanical, electro-mechanical, hydrostatic, etc., to steerable axles transaxle assemblies. Different types of steerable axles transaxle assemblies having similar pivotable knuckle(s) assemblies and therefore, similar mounting features, can be used in a single vehicle configuration such as, for example, in a hybrid vehicle having both a hydrostatic transmission and an electrically driven transmission that are both converted to steerable axles transaxle assemblies in accordance with the present invention.

A complete, pre-tested steerable axles transaxle assembly that is ready to install onto a vehicle frame can improve assembly efficiency and reduce assembly tooling and labor costs for a vehicle manufacturer while improving assembly accuracy and product quality.

The modular nature of the steerable axles transaxle assemblies disclosed herein enables versatility for designing across product platforms.

A better understanding of the objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWINGS

FIG. 6 is an elevational view of a dual pivotable knuckles assembly of the transaxle assembly of FIG. 5, with certain elements depicted in dashed and phantom lines to reveal details.

FIG. 7 is an elevational view of an optional I-beam configuration of the pivot bearings support shown in FIG. 6.

FIG. 8 is a top plan view of the dual pivotable knuckles assembly of FIG. 6, incorporating the optional I-beam configuration of the pivot bearings support shown in FIG. 7.

DETAILED DESCRIPTION OF THE DRAWINGS

Figure 1:
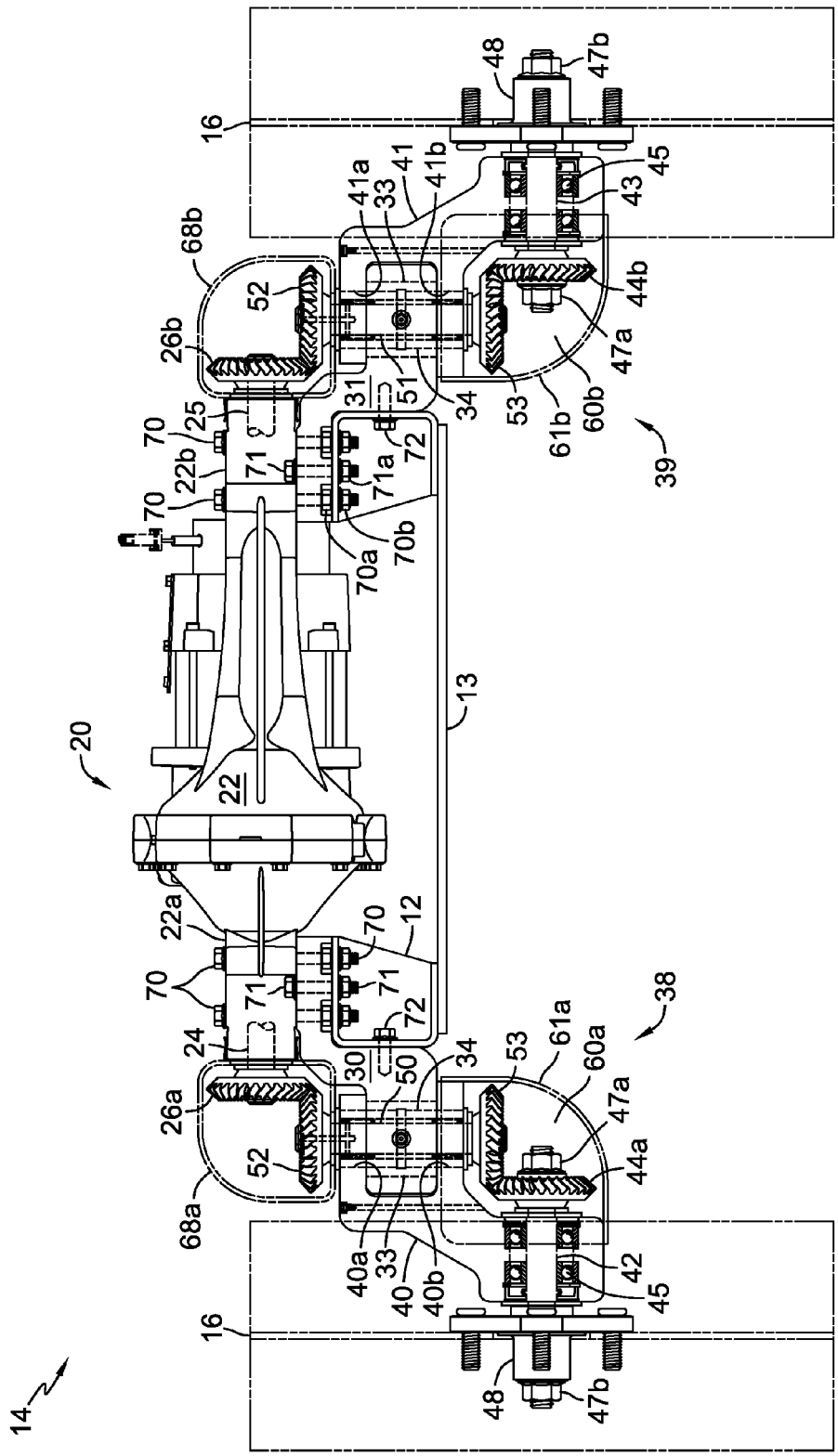
FIG. 1 is an elevational view of a first embodiment of a transaxle assembly in accordance with the present invention, with certain elements depicted in dashed and phantom lines to reveal details.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. As stated above, the present specification is intended to be taken as a whole and interpreted in accordance with the principles of the present invention as taught herein and understood by one of ordinary skill in the art.

Referring to FIGS. 1-4, a first embodiment of a steerable axles transaxle assembly 14, referred to herein as simply "transaxle 14," includes a transmission 20 having a housing 22 having a first end 22a and a second end 22b. A first driven shaft 24 extends out the first end 22a and a second driven shaft 25 extends out the second end 22b. A first pinion gear 26a is disposed on an external end of the first driven shaft 24 and a second pinion gear 26b is disposed on an external end of the second driven shaft 25. A first pivotable knuckle assembly 38 is attached to the housing first end 22a and a second pivotable knuckle assembly 39 is attached to the housing second end 22b. The first pivotable knuckle assembly 38 includes a first pivot bearing support 30 and the second pivotable knuckle assembly 39 includes a second pivot bearing support 31. Each pivot bearing support 30, 31 includes a cylindrical opening 30c, into which a pivot bearing 33 may be installed.

A first axle 42 is rotatably supported in and extends through a first steerable axle support 40 of pivotable knuckle assembly 38 and a second axle 43 is rotatably supported in and extends through a second steerable axle support 41 of pivotable knuckle assembly 39. One end of each of the first and second axles 42, 43 is gear-driven, as will be described in more detail herein, while a second end of each axle 42, 43 drives a wheel 16 of a vehicle 10.

As shown, knuckle assembly 39 can be a mirror image of knuckle assembly 38. Notably, the only difference between pivot bearing supports 30 and 31, as illustrated, is the mirrored positioning of grease accommodation features described herein that are formed in pivot bearing supports 30 and 31 for grease fittings 86. Optionally, grease fittings 86 can be positioned such that two identical bearing supports (not shown) can be used in place of bearing supports 30, 31. Furthermore, grease fittings 86 are not required if, for example, certain known composite bearing materials are used to form the pivot bearings.

Dependent upon load parameters applied when designing and engineering vehicle 10 and upon the material characteristics of pivot bearing supports 30, 31, a pivot bearing 33 may not be required in opening 30c for some lighter duty applications, i.e., the cylindrical surface of opening 30c can serve as a bearing surface. Pivot bearing supports 30, 31 can be formed from a variety of materials, such as cast iron, hardened steel, forged steel, alloy steel, aluminum, composites, etc., based upon vehicle configuration and load parameters.

As shown, a grease fitting 86 can be installed in a passage 30f that connects to a grease groove 30g to allow periodic lubrication of the pivot bearing 33. Pivot bearing 33 can be a simple, single, cylindrical bearing, as shown, or a more complex bearing, a pair of bushings, etc. Many different types of bearings are well known, their utilization is dependent upon loading and operational environment considerations, and they will not be described in detail herein.

Pivot bearing supports 30, 31 each have a plurality of openings 30a for attachment of pivotable knuckle assembly 38 to housing end 22a by means of a plurality of fasteners, such as screws 70, along with a corresponding first set of nuts 70a that is installed into recesses 30e formed in each of the pivot bearing supports 30, 31. Recesses 30e can be round counterbore-style recesses, as shown, or could be hexagonal, for example, so that nuts 70a cannot rotate, thereby facilitating ease of assembly and disassembly, including removal of transmission 20 without removal of the pivotable knuckle assemblies 38, 39 from vehicle frame 12, as will be further described.

As shown in FIG. 1, screws 70 are long enough to extend through vehicle frame 12 during the installation of transaxle 14 onto frame 12 so that a corresponding second set of nuts 70b can be used in conjunction with screws 70 to attach transaxle 14, including housing first end 22a and housing second end 22b, to frame 12. In addition to screws 70, a second plurality of fasteners, such as screws 71, is installed through openings 30b formed in each pivot bearing support 30, 31 in order to separately attach transaxle 14 to frame 12 via nuts 71a without further attaching housing first end 22a and housing second end 22b to frame 12. Then, if nuts 71a are captured so that they cannot rotate, as described previously, transmission 20 can be removed from frame 12 for servicing by simply removing nuts 70b and screws 70 without removing the pivotable knuckle assemblies 38, 39 (and associated wheels 16 of vehicle 10) from frame 12.

Alternatively, a shorter variant of screws 70 may be used so that they do not extend through vehicle frame 12 or, as another alternative, frame 12 may comprise clearance openings that allow screws 70 to extend through frame 12 without attachment thereto. In a manner similar to that described previously herein, these two alternatives also facilitate removal of transmission 20 without removing the pivotable knuckle assemblies 38, 39 from frame 12. Both of these alternatives are accomplished by attaching transaxle 14 to frame 12 via a separate plurality of screws 71 and nuts 71a installed through openings 30b formed in pivot bearing supports 30, 31. Particularly with these two alternatives, considering that screws 70 are not used to attach transmission 20 directly to frame 12, it may be desirable to increase the size of the mounting flange 30h, as indicated by phantom lines 30i shown on FIG. 3, so that additional openings 30b, along with additional screws 71 and nuts 71a, can be added to ensure appropriate structural attachment of transaxle 14 to frame 12, depending upon the operating parameters of vehicle 10 and resultant stresses imparted to frame 12.

Furthermore, numerous variations of the mounting flange 30h of bearing supports 30, 31 are possible while maintaining interchangeability with the bearing supports 30, 31 shown assembled in knuckle assemblies 38, 39. This simple variation of the mounting flange 30h permits adaptation to a variety of transmissions and vehicle frames, thereby facilitating modularity.

As described previously herein, fasteners, such as plurality of screws 71 and nuts 71a, can be used to attach transaxle 14 to vehicle frame 12. Alternatively, other fastening methods, such as riveting, for example, could be used to attach pivot bearing supports 30, 31 of transaxle 14 to frame 12.

If needed, screws 72 can be used to further strengthen and stabilize the assembly of transaxle 14 to vehicle frame 12. Screws 72 engage openings 30d, which may be tapped openings, formed in pivot bearing supports 30, 31.

In order to further strengthen vehicle frame 12 and protect transaxle 14 from flexural damage, frame reinforcing members such as gussets, C-channel crossmembers, I-beam crossmembers, etc. (not shown), can be added where needed, as is known. In order to protect transmission 20 from flexural and/or impact damage, a vehicle frame reinforcement member such as plate 13 can be added to frame 12.

Figure 2:
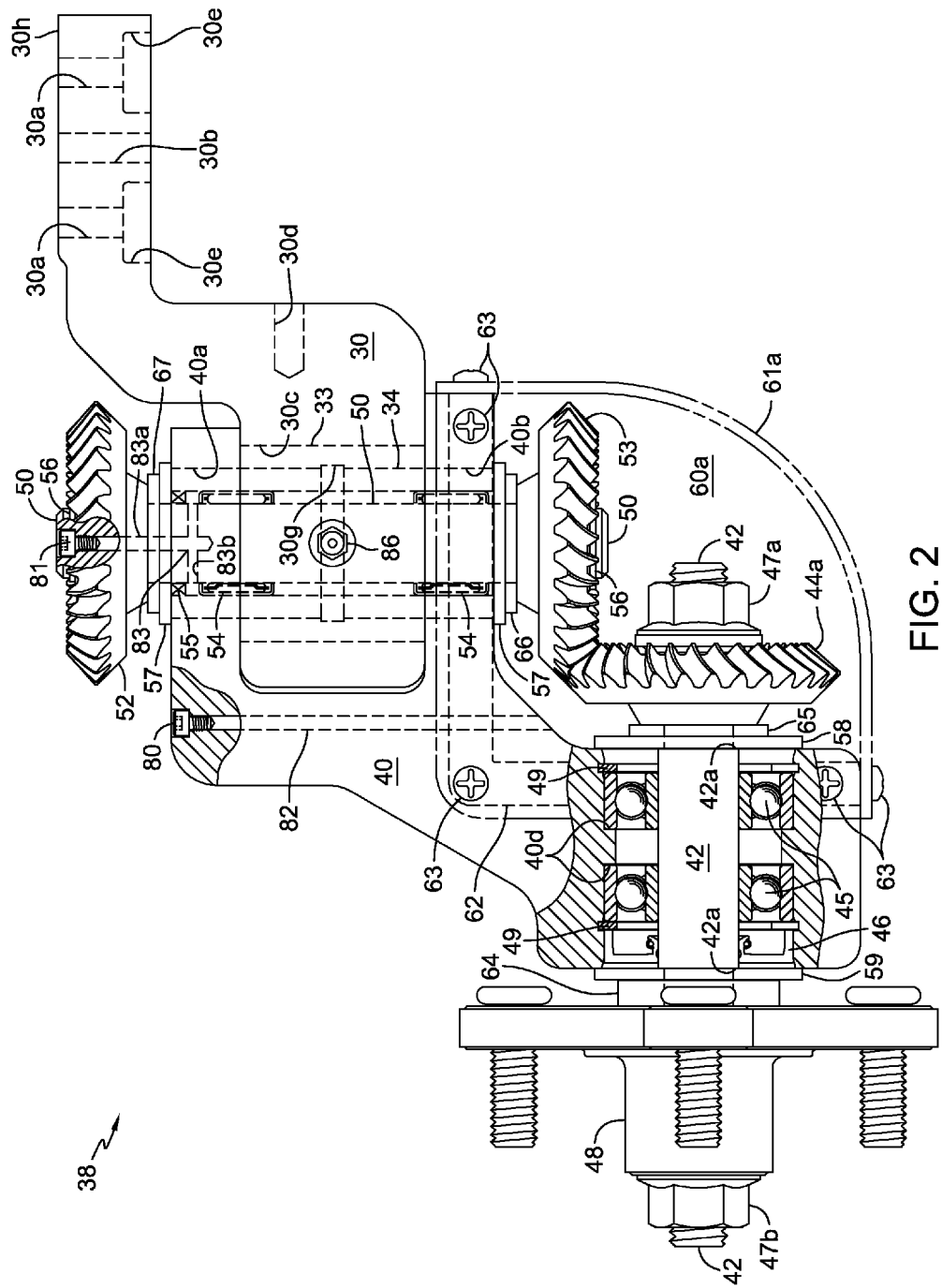
FIG. 2 is an elevational view of a single pivotable knuckle assembly of the transaxle assembly of FIG. 1, with certain elements depicted in dashed and phantom lines and with portions cut away to reveal details.
Figure 3:
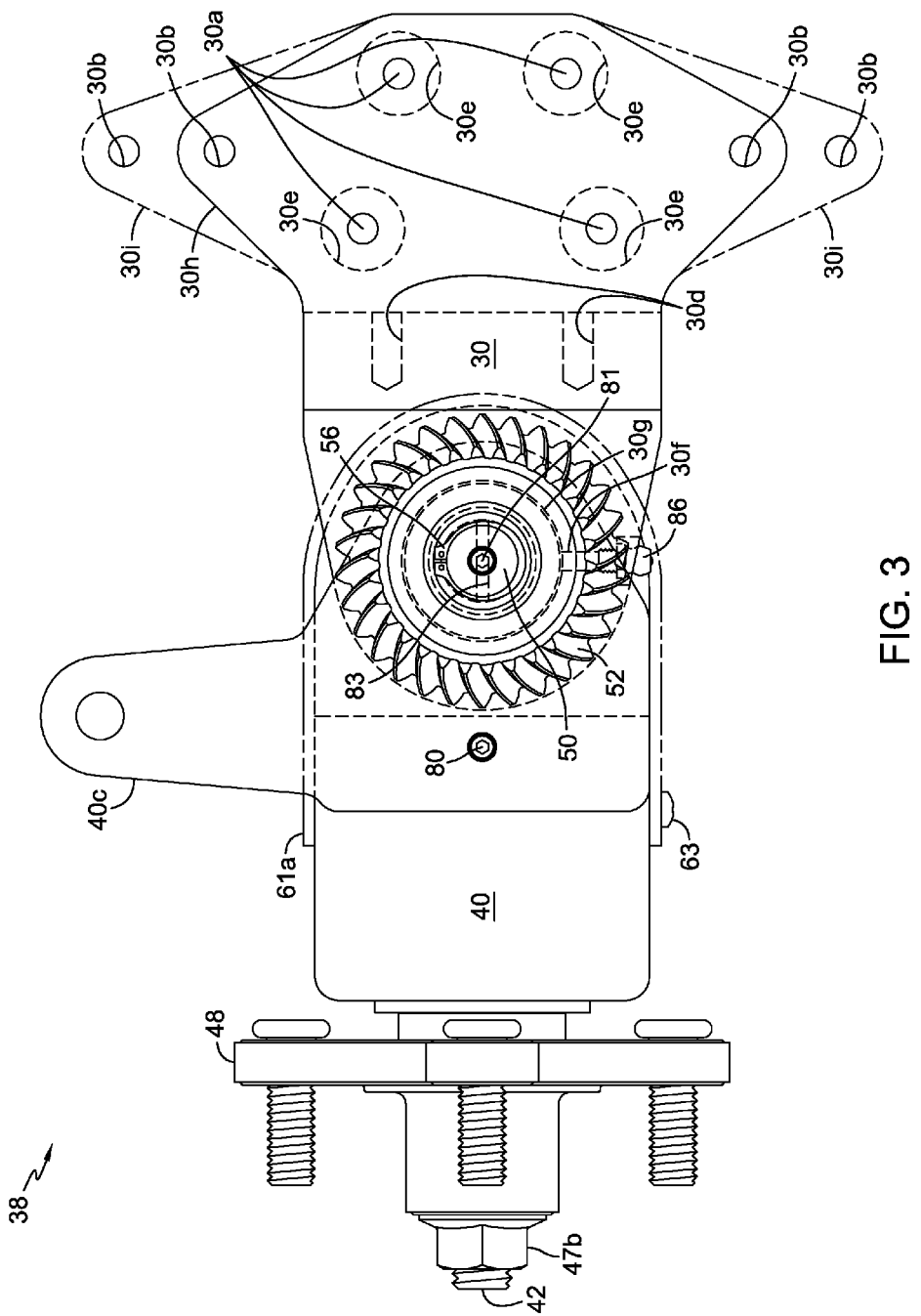
FIG. 3 is a top plan view of the pivotable knuckle assembly of FIG. 2.

Referring primarily to FIGS. 1 and 2, the first and second pivotable knuckle assemblies 38, 39 include a first and second steerable axle support 40, 41, respectively. Each of the knuckle assemblies 38, 39 has a shaft support tube 34 that is pivotably supported by and extends through each of the pivot bearings 33 so that both ends of each shaft support tube 34 extend into mating openings 40a, 40b and 41a, 41b formed in each of the first and second steerable axle supports 40 and 41, respectively.

Referring again to FIGS. 1-4, steerable axle supports 40, 41 are pivoted about the rotational axes of a third driven shaft 50 and a fourth driven shaft 51, respectively, by means of steering arms 40c, 41c, respectively. Steering arms 40c and 41c can be integrally formed, as shown, on axle supports 40, 41 or, alternatively, with minor modifications, can be attached thereto. If attachment accommodations (not shown) for attachable versions of arms 40c, 41c are formed in axle supports 40, 41 and are located symmetrically fore and aft of the rotational axes of axles 42, 43, then axle supports 40, 41 can be identical components. Furthermore, if such attachment accommodations are provided, then interchangeable variations of steering arms 40c, 41c, such as steering arms having various lengths and/or angles of attachment relative to axle supports 40, 41, is facilitated, thereby introducing a further degree of modularity.

Referring again primarily to FIGS. 1 and 2, the first axle 42 and the second axle 43, that are oriented perpendicularly to the driven shafts 50, 51, are each supported by one or more bearings 45 that are mounted in the first and second steerable axle supports 40, 41, respectively, and retained in position by retaining rings 49 or the like in conjunction with features such as bearing lands 40d shown in FIG. 2. Bearings 45 are illustrated as ball bearings but could be tapered roller bearings, needle bearings, etc., depending upon the vehicle configuration, load requirements, etc. A driven axle gear 44a is fixed on one end of the first axle 42 and a driven axle gear 44b is fixed on one end of the second axle 43. Steps or shoulders, such as shoulders 42a, can be formed on axles 42 and 43 to control positioning of axles 42, 43 and limit axial loading on bearings 45 while allowing appropriate clearance for axle rotation. Other steps or shoulders (not shown) can be formed on axles 42, 43 to control positioning of gears and hubs, for example, to prevent binding when nuts 47a and 47b are installed.

As described previously herein, transmission 20 includes a first driven shaft 24 having a first pinion gear 26a disposed on an external end and a second driven shaft 25 having a second pinion gear 26b disposed on an external end. The third driven shaft 50 and the fourth driven shaft 51, that are oriented perpendicularly to the first and second driven shafts 24, 25, are each rotatably mounted in and extend through one of the shaft support tubes 34 of knuckle assemblies 38, 39. Each of the driven shafts 50, 51 has a driven gear 52 fixed on one end and a driving gear 53 fixed on a second end, wherein each of the driven gears 52 is engaged to and driven by one of the first pinion gear 26a or the second pinion gear 26b and each of the driving gears 53 is engaged to and drives one of the driven axle gears 44a or 44b.

The pinion gears 26a, 26b, driven gears 52, driving gears 53 and driven axle gears 44a, 44b can all be the same size and type of spiral bevel gear, as shown, or optionally they can be different sizes and/or types of gears, as needed, for various gear reductions, working parameters, etc.

As shown most clearly in FIG. 2, each of the driven shafts 50 and 51 is supported by one or more bearings 54. The driven shafts 50 and 51 can be retained in shaft support tubes 34 by means of retaining rings 56 or the like that also retain gears 52 and 53 on shafts 50 and 51. As is known in the art, shoulders or steps (not shown) are formed on shafts 50 and 51 to control positioning of shafts 50 and 51, while allowing appropriate clearance for shaft rotation. Thrust washers 57 can be employed to provide running surfaces for gears 52 and 53 and prevent excessive wear of mating components.

Axles 42 and 43 can each be retained in an axle support 40 and 41, respectively, by means of nuts 47a and 47b. Nuts 47a retain gears 44a and 44b that are fixed on one end of each axle 42 and 43, respectively, while nuts 47b retain wheel hubs 48 that are rotatably fixed on a second end of each axle 42 and 43. Wheel hubs 48 facilitate attachment of each axle 42, 43 to a wheel 16 of vehicle 10. Thrust washers 58 can be employed to provide running surfaces for gears 44a and 44b, while thrust washers 59 can be employed to provide running surfaces for hubs 48.

Additional thrust washers or spacers, such as spacers 64 shown in FIG. 2, can be added between hubs 48 and thrust washers 58, as needed, to properly locate and/or provide appropriate clearance between components. Additional thrust washers or spacers, such as spacers 65, 66 and 67, can be added between various gears and thrust washers, as needed, to properly locate components and achieve proper gear mesh.

Referring now to FIGS. 1 and 2, sumps 60a and 60b provide lubrication for gears 44a and 44b, respectively, and for gears 53, bearings 45 and bearings 54. Each sump 60a, 60b is sealed at an outer end of each axle 42, 43 by a seal 46 and at an upper end of each shaft 50, 51 by a seal 55. Each sump 60a, 60b can be filled with oil by means of fluid passages 82 and 83 having removable plugs 80 and 81 installed therein, respectively. A fluid passage 82 is formed in each axle support 40 and 41 and a T-shaped fluid passage 83 having a vertical passage 83a intersected by a horizontal passage 83b is formed in each of the driven shafts 50 and 51. Passages 83a can remain unfilled when sumps 60a and 60b are filled so that the fluid in sumps 60a and 60b can expand during operation of transaxle 14 without forcing leakage through various seals as the sump fluid temperature rises.

Sump covers 61a, 61b, depicted using phantom lines to reveal details that would otherwise be hidden, are attached to the axle supports 40, 41, respectively, to enclose sumps 60a and 60b, respectively. Each sump cover 61a and 61b is attached by means of screws 63 or the like and is sealed by means of sealant or a perimeter seal or gasket 62, depicted using dashed lines. The quantity, style and placement of screws 63 shown in FIG. 2 is illustrative only, and screws 63 or the like can be employed as needed to ensure durable sealing of sump covers 61a, 61b.

Thrust washers 57 and 58 can have holes or openings (not shown) formed therein to allow flow of fluid throughout the volume contained between seals 46 and 55, the flow of fluid particularly needed when filling sumps 60a, 60b.

Gear covers 68a and 68b, depicted generically in phantom lines to reveal details that would otherwise be hidden, can be provided to shield and protect gears 52, 26a and 26b from contact with foreign objects, contamination, etc. Grease or other suitable lubricant can be applied to gears 52, 26a and 26b. Optionally, gear covers 68a and 68b could be attached to brackets (not shown) attached to vehicle frame 12.

Figure 4:
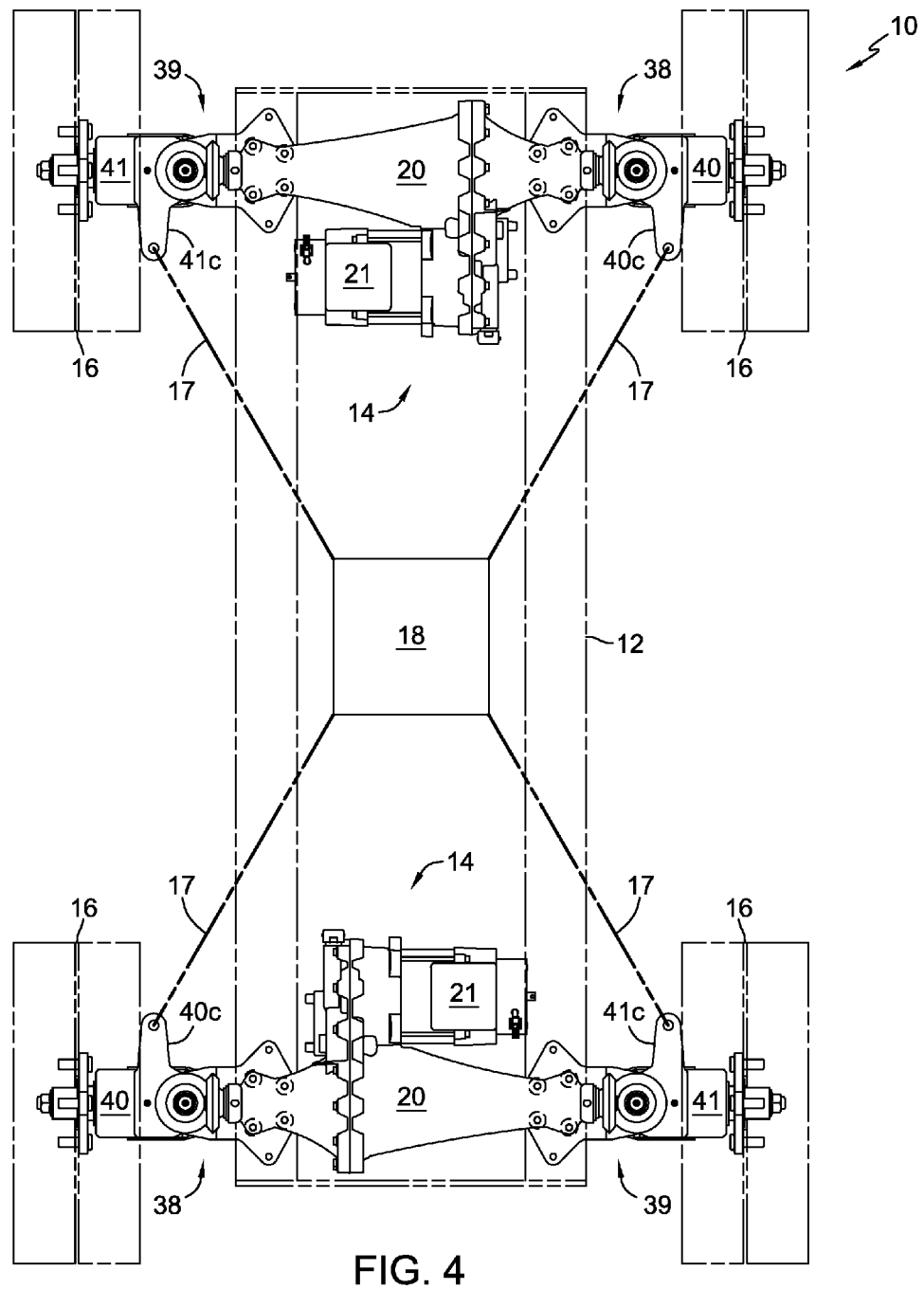
FIG. 4 is a diagrammatic top plan view of a four-steered-wheel-drive generic vehicle incorporating two of the transaxle assemblies of FIG. 1.

Referring now to FIG. 4, a generic vehicle 10, having a vehicle frame 12 to which two transaxles 14 are attached, is depicted generically because it can be any of a variety of vehicle types including, but not limited to, lawn mowers, utility vehicles, etc. Furthermore, although transaxles 14 are illustrated as having variable-speed electro-mechanical transmissions 20 having integrated electric motors 21, a variety of other transmission types that are not electrically driven could be used in place of transmissions 20.

Vehicle 10 is illustrated as a four-steered-wheel-drive vehicle wherein one transaxle 14 has been rotated 180 degrees in relation to the other. In this configuration, due to the 180 degree rotation of one transaxle 14 in relation to the other, one motor 21 is electrically driven in one direction of rotation and the other motor 21 is electrically driven in the opposite direction of rotation so that the wheels 16 of vehicle 10 will all be rotationally driven in the same direction. Generically depicted linkages 17 that are connected to each of the steering arms 40c, 41c can be mechanical linkages, electric actuators, hydraulic cylinders, etc, that are controlled by a steering control mechanism or device 18. Steering control mechanism or device 18 can be any known electronic, mechanical, electro-mechanical, hydraulic, etc., device employed to control the steering linkages 17. Depiction of four linkages 17 is not meant to imply that all four wheels must be steered independently (although they can be, if desired), as tie rods may be used to connect steering arms, as is well known.

Figure 5:
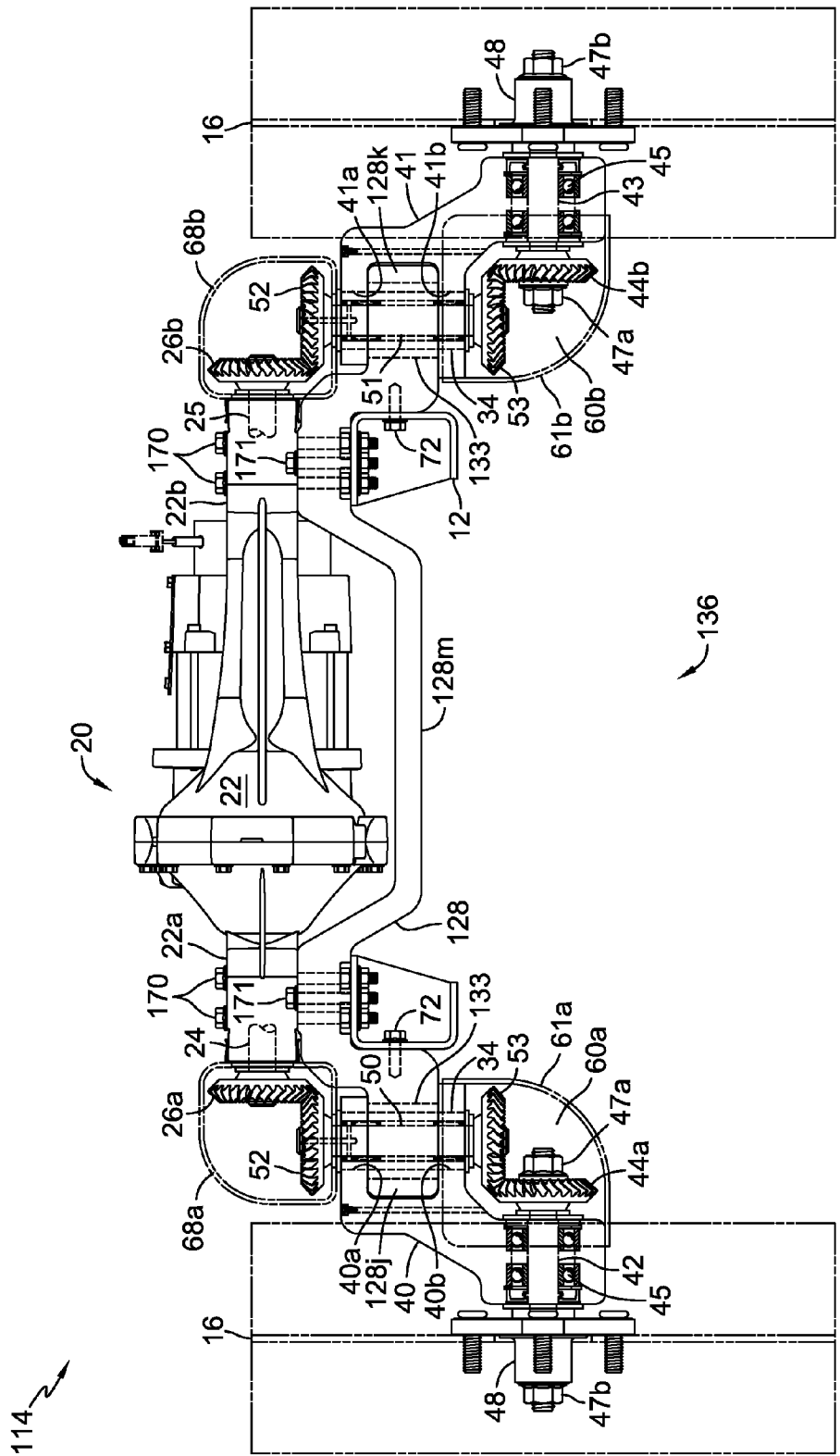
FIG. 5 is an elevational view of a second embodiment of a transaxle assembly, with certain elements depicted in dashed and phantom lines to reveal details.

Referring to FIGS. 5 and 6, a second embodiment of a transaxle 114 is essentially the same as the first embodiment transaxle 14, except as will be described herein. Whereas transaxle 14 includes a first pivotable knuckle assembly 38 and a second pivotable knuckle assembly 39 separately mounted to transmission housing 22, transaxle 114 includes a dual pivotable knuckles assembly 136 having both of the steerable axle supports 40, 41 attached thereto such that the dual pivotable knuckles assembly 136 can be pre-assembled and then attached to transmission 20 to form transaxle 114.

In transaxle 114, a first pivot bearing support 128*j* is connected to a second pivot bearing support 128*k* by an integrally formed crossmember 128*m* disposed under the housing 22 to form a pivot bearings support 128. Pivot bearing supports 128*j* and 128*k* of pivot bearings support 128 correspond to pivot bearing supports 30 and 31, respectively, of transaxle 14 of the first embodiment. Crossmember 128*m* protects portions of transaxle 114, and particularly transmission 20 of transaxle 114, from flexural and/or impact damage.

Each of the pivot bearing supports 128*j* and 128*k* includes openings 128*a* and 128*b*, corresponding to similar openings 30*a* and 30*b*, respectively, shown in the first embodiment. In like manner to the first embodiment, openings 128*a* and 128*b* receive fasteners 170 and 171 that are similar to fasteners 70 and 71, respectively, and serve the same function. Each of the pivot bearing supports 128*j* and 128*k* also includes cylindrical openings 128*c*, openings 128*d* and recesses 128*e* that correspond to the same or similar openings 30*c*, openings 30*d* and recesses 30*e*, respectively. A pivot bearing 133 is installed in each of the cylindrical openings 128*c*. Each pivot bearing 133 is illustrated as a composite bearing that does not require lubrication.

The integrally formed crossmember 128*m* may have a simple rectangular cross-section. Optionally, as shown in FIGS. 7 and 8, an integrally formed crossmember 129*m* of a pivot bearings support 129 of a dual pivotable knuckles assembly 137 has an I-beam cross-section for greater strength and flexural resistance. All other features of pivot bearings support 129, i.e., 129*a*, 129*b*, 129*c*, 129*d*, 129*e*, 129*j* and 129*k* are substantially the same as previously-described features 128*a*, 128*b*, 128*c*, 128*d*, 128*e*, 128*j* and 128*k*, respectively, of pivot bearings support 128 such that pivot bearings support 129 is interchangeable with pivot bearings support 128.

Figure 9:
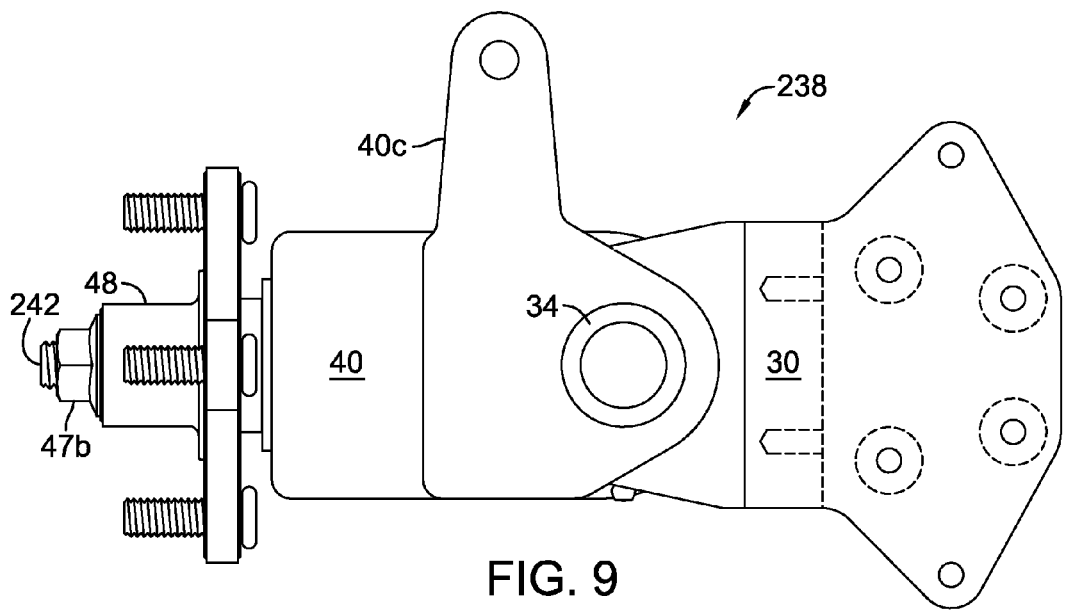
FIG. 9 is a top plan view of a gearless pivotable knuckle assembly.
Figure 10:
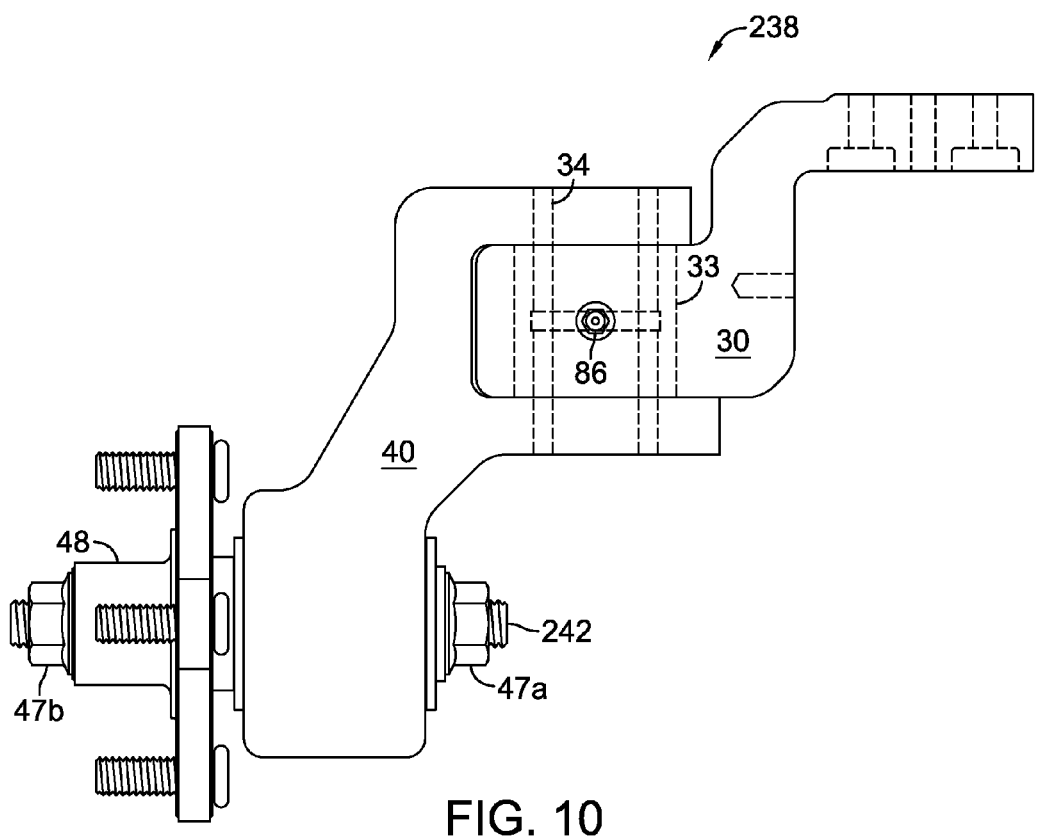
FIG. 10 is an elevational view of the gearless pivotable knuckle assembly of FIG. 9.
Figure 11:
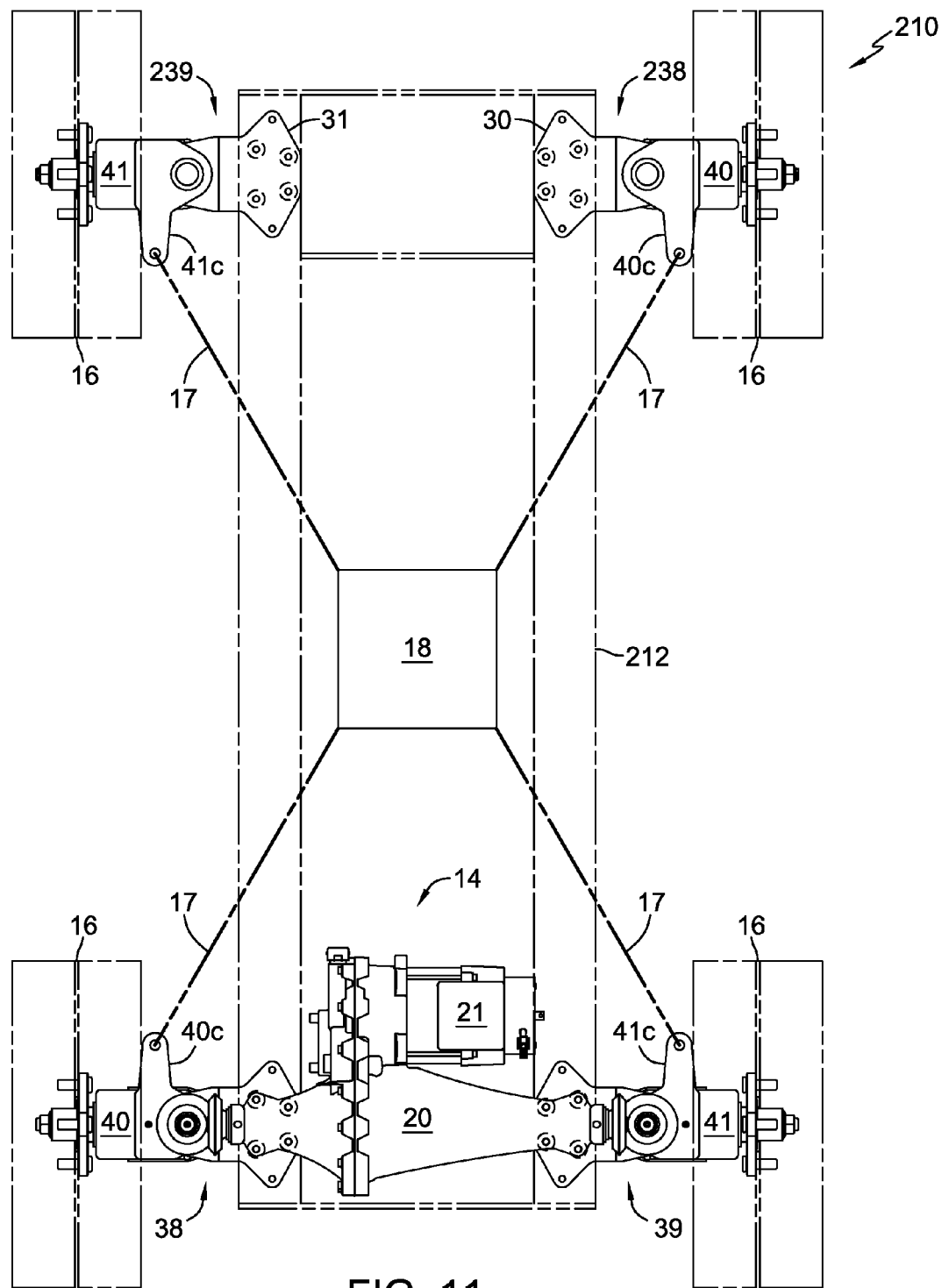
FIG. 11 is a diagrammatic top plan view of a four-steered-wheel, two-wheel-drive generic vehicle incorporating one of the transaxle assemblies of FIG. 1.

Referring to FIG. 11, a generic vehicle 210 that is similar to generic vehicle 10, but having just one transaxle 14 attached to a vehicle frame 212, is depicted. Vehicle 210 is a four-steered-wheel, two-wheel-drive vehicle. To enable this configuration, the gear sets and certain other components shown in FIG. 2 have been removed from pivotable knuckle assembles 38 and 39 to form pivotable knuckle assemblies 238 and 239, respectively. Pivotable knuckle assembly 238 is illustrated in FIGS. 9 and 10 and pivotable knuckle assembly 239 can be a mirror image of pivotable knuckle assembly 238, as shown in FIG. 11. Thus, the basic structural components of pivotable knuckle assemblies 238 and 239 can be the same as those used in pivotable knuckle assemblies 38 and 39, respectively, thereby further facilitating modularity. As shown in FIG. 10, a shorter axle 242 is used in pivotable knuckle assembly 238 in lieu of axle 42 used in pivotable knuckle assembly 38 shown in FIG. 2. Alternatively, axle 42 can be used in pivotable knuckle assembly 238 by adding a spacer in place of the removed gear 44*a*. In yet another alternative configuration, a pivot bearings support 128 or 129 can be used in lieu of the bearing supports 30, 31 shown in FIG. 11, in the same manner as illustrated in FIGS. 6-8.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

The invention claimed is:

1. A transaxle assembly for driving a plurality of wheels of a vehicle, comprising:
   a transmission comprising a transmission housing having a first end and a second end, a first driven shaft extending out the first end and a second driven shaft extending out the second end;
   a first pinion gear disposed on an external end of the first driven shaft and a second pinion gear disposed on an external end of the second driven shaft;
   a first pivot bearing support connected to the first end of the transmission housing and a second pivot bearing support connected to the second end of the transmission housing, each pivot bearing support comprising a pivot bearing support opening;
   a first steerable axle support disposed at the first end of the transmission housing and a second steerable axle support disposed at the second end of the transmission housing;
   a first axle rotatably supported in and extending through the first steerable axle support and a second axle rotatably supported in and extending through the second steerable axle support;
   a first driven axle gear fixed on one end of the first axle and a second driven axle gear fixed on one end of the second axle, wherein a second end of each of the first axle and the second axle is engaged to and drives one of the plurality of wheels of the vehicle;
   a first shaft support tube pivotably supported by and extending through the first pivot bearing support so that both ends of the first shaft support tube extend into mating openings formed in the first steerable axle support;
   a second shaft support tube pivotably supported by and extending through the second pivot bearing support so that both ends of the second shaft support tube extend into mating openings formed in the second steerable axle support;
   a third driven shaft rotatably mounted in and extending through the first shaft support tube and having a first driven gear fixed on one end and a first driving gear fixed on a second end, wherein the first driven gear is engaged to and driven by the first pinion gear and the first driving gear is engaged to and drives the first driven axle gear; and
   a fourth driven shaft rotatably mounted in and extending through the second shaft support tube and having a second driven gear fixed on one end and a second driving gear fixed on a second end, wherein the second driven gear is engaged to and driven by the second pinion gear and the second driving gear is engaged to and drives the second driven axle gear.

2. The transaxle assembly of claim 1, wherein the first driven shaft and the second driven shaft are perpendicular to the third driven shaft and the fourth driven shaft.

3. The transaxle assembly of claim 1, wherein the first axle and the second axle are perpendicular to the third driven shaft and the fourth driven shaft.

4. The transaxle assembly of claim 1, wherein the first pivot bearing support is connected to the second pivot bearing support by an integrally formed crossmember disposed under the transmission housing.

5. A pivotable knuckle assembly for pivoting one of a plurality of wheels of a vehicle having a vehicle frame, the pivotable knuckle assembly comprising:
   a pivot bearing support comprising a first means for attaching the pivot bearing support to a transmission, a second means for attaching the pivot bearing support to the vehicle frame and a pivot bearing support opening formed therein;
   a steerable axle support having an axle rotatably supported in and extending through the steerable axle support;
   a driven axle gear fixed on one end of the axle, wherein a second end of the axle is engaged to and drives one of the plurality of wheels;
   a shaft support tube pivotably supported by and extending through the pivot bearing support so that both ends of the shaft support tube extend into mating openings formed in the steerable axle support;
   a driven shaft rotatably mounted in and extending through the shaft support tube and having a driven gear fixed on one end and a driving gear fixed on a second end, wherein the driven gear is engaged to and driven by an output pinion gear of the transmission and the driving gear is engaged to and drives the driven axle gear.

6. The pivotable knuckle assembly of claim 5, wherein the driven shaft is perpendicular to the axle.

7. A pivotable knuckle assembly for driving and pivoting a wheel, the pivotable knuckle assembly comprising:
   a pivot bearing support capable of being attached to a transmission and comprising a pivot bearing support opening having a pivot bearing mounted therein;
   a steerable axle support pivotably connected to the pivot bearing support;
   an axle rotatably supported in the steerable axle support;
   an axle gear fixed on one end of the axle, wherein a second end of the axle is engaged to and drives the wheel;
   a shaft support tube pivotably supported by and extending through the pivot bearing so that both ends of the shaft support tube extend into mating openings formed in the steerable axle support; and
   a drivable shaft rotatably mounted in and extending through the shaft support tube and having a drivable gear fixed on one end and a driving gear fixed on a second end, wherein the driving gear is engaged to the axle gear.

8. The pivotable knuckle assembly of claim 7, wherein the drivable gear is engaged to and driven by an output pinion gear of the transmission.

9. The pivotable knuckle assembly of claim 7, wherein the drivable shaft is perpendicular to the axle.

10. The pivotable knuckle assembly of claim 7, further comprising a means for attaching the pivot bearing support to a vehicle frame.

11. An assembly for driving and pivoting a plurality of wheels of a vehicle having a vehicle frame, the assembly comprising:
   a pivot bearings support for attachment to a transmission, and comprising a first pivot bearing support opening disposed at a first end thereof and having a first pivot bearing mounted therein, and a second pivot bearing support opening disposed at a second end thereof and having a second pivot bearing mounted therein;
   a first steerable axle support rotatably mounted at the first end of the pivot bearings support and having a first axle rotatably supported therein;
   a second steerable axle support rotatably mounted at a second end of the pivot bearings support and having a second axle rotatably supported therein;
   a first driven axle gear fixed on one end of the first axle and a second driven axle gear fixed on one end of the second axle, wherein a second end of the first axle is engaged to and drives one of the plurality of wheels and a second end of the second axle is engaged to and drives another of the plurality of wheels;
   a first shaft support tube pivotably supported by and extending through the first pivot bearing so that both ends of the first shaft support tube extend into a first set of mating openings formed in the first steerable axle support;
   a second shaft support tube pivotably supported by and extending through the second pivot bearing so that both ends of the second shaft support tube extend into a second set of mating openings formed in the second steerable axle support;
   a first drivable shaft rotatably mounted in and extending through the first shaft support tube and having a first drivable gear fixed on one end and a first driving gear fixed on a second end and engaged to the first driven axle gear; and
   a second drivable shaft rotatably mounted in and extending through the second shaft support tube and having a second drivable gear fixed on one end and a second driving gear fixed on a second end and engaged to the second driven axle gear.

12. The assembly of claim 11, wherein the first drivable gear is engaged to and driven by a first output pinion gear of the transmission and the second drivable gear is engaged to and driven by a second output pinion gear of the transmission.

13. The assembly of claim 11, wherein the first axle and the second axle are perpendicular to the first drivable shaft and the second drivable shaft.

14. The assembly of claim 11, further comprising a means for attaching the pivot bearings support to the vehicle frame.

* * * * *